US012065804B2

(12) United States Patent
Clare et al.

(10) Patent No.: US 12,065,804 B2
(45) Date of Patent: Aug. 20, 2024

(54) VISUAL INDICATION SYSTEM FOR MOBILE MACHINES

(71) Applicant: Trimble Inc., Sunnyvale, CA (US)

(72) Inventors: Adam Clare, Westminster, CO (US); Ethan Moe, Westminster, CO (US)

(73) Assignee: Trimble Inc., Westminster, CO (US)

( * ) Notice: Subject to any disclaimer, the term of this patent is extended or adjusted under 35 U.S.C. 154(b) by 319 days.

(21) Appl. No.: 17/179,653

(22) Filed: Feb. 19, 2021

(65) Prior Publication Data

US 2022/0267992 A1 Aug. 25, 2022

(51) Int. Cl.
*E02F 9/20* (2006.01)
*E02F 9/24* (2006.01)
*E02F 9/26* (2006.01)
*G01S 17/931* (2020.01)

(52) U.S. Cl.
CPC ............... *E02F 9/205* (2013.01); *E02F 9/24* (2013.01); *E02F 9/264* (2013.01); *G01S 17/931* (2020.01)

(58) Field of Classification Search
CPC .. E02F 9/205; E02F 9/24; E02F 9/264; G01S 17/931; B60Q 2800/20; B60Q 1/503; B60Q 1/5037; B60Q 1/543; B60Q 1/525; B60Q 1/2673; B60Q 1/34; G08G 1/166
USPC .......... 701/50, 301; 340/438, 469, 456, 461, 340/982, 985
See application file for complete search history.

(56) References Cited

U.S. PATENT DOCUMENTS

| 9,633,537 B2 | 4/2017 | Beggs et al. | |
| 2003/0149530 A1* | 8/2003 | Stopczynski | G08G 1/166 340/436 |
| 2005/0017862 A1* | 1/2005 | Monck | B60Q 1/34 340/469 |

(Continued)

FOREIGN PATENT DOCUMENTS

| EP | 3 640 089 A1 | 4/2020 |
| EP | 3 702 539 A1 | 9/2020 |
| KR | 2017-0086968 A | 7/2017 |

OTHER PUBLICATIONS

A. M. Trigo et al., "Autonomous Vehicles on the Factory Floor: An Approach to Safety," 2021 IEEE 30th International Symposium on Industrial Electronics (ISIE), Kyoto, Japan, 2021, pp. 1-8, doi: 10.1109/ISIE45552.2021.9576211. (Year: 2021).*

(Continued)

*Primary Examiner* — Elaine Gort
*Assistant Examiner* — Ellis B. Ramirez
(74) *Attorney, Agent, or Firm* — Kilpatrick Townsend & Stockton LLP

(57) ABSTRACT

Described herein is a visual indication system implemented on a mobile machine. The visual indication system at least partially surrounds the mobile machine and includes a plurality of displayable regions. Objects surrounding the mobile machine are detected using an object detection sensor. A direction with respect to the mobile machine is detected for each of the objects. A current state of the mobile machine is determined. An object-directed indicator for each of the objects is generated based on the current state of the mobile machine. The object-directed indicator for each of the objects is displayed on the visual indication system at a particular displayable region based on the direction of the particular object.

20 Claims, 9 Drawing Sheets

(56) References Cited

U.S. PATENT DOCUMENTS

| | | | |
|---|---|---|---|
| 2012/0025964 A1* | 2/2012 | Beggs | G08B 5/36 |
| | | | 340/435 |
| 2014/0159881 A1* | 6/2014 | Adami | B66F 17/003 |
| | | | 340/425.5 |
| 2017/0282784 A1 | 10/2017 | Foster et al. | |
| 2018/0237156 A1* | 8/2018 | Ross | G01C 21/365 |
| 2019/0161943 A1* | 5/2019 | Frank | E02F 9/261 |
| 2020/0288936 A1* | 9/2020 | Knutson | A47L 11/4036 |
| 2021/0174660 A1* | 6/2021 | Kamimura | E02F 9/26 |

OTHER PUBLICATIONS

Extended European Search Report for Application No. 22157436.1-1012, mailed May 30, 2022, 9 pages.
Office Action for Application No. 22 157 436.1—1009, mailed Jun. 28, 2024, 5 pages.

* cited by examiner

VISUAL INDICATION SYSTEM FOR MOBILE MACHINES

BACKGROUND OF THE INVENTION

Modern mobile machinery, including construction and agricultural machines, have dramatically increased the efficiency of performing various work-related tasks. For example, earthmoving machines employing automatic slope control systems are able to grade project areas using fewer passes than what was previously done manually. As another example, modern asphalt pavers and other road makers have allowed replacement of old roads and construction of new roads to occur on the order of hours and days instead of what once took place over weeks and months. Due to the automation of various aspects, construction and agriculture projects can be carried out by crews with fewer individuals than what was previously required. Much of the technological advances of mobile machinery are owed in part to the availability of accurate sensors that allow real-time monitoring of the condition and position of a machine's components and/or the environment surrounding the machine.

Despite the improvements to modern mobile machinery, particularly with respect to autonomous and self-driving mobile machines, new systems, methods, and techniques are still needed.

BRIEF SUMMARY OF THE INVENTION

The following description relates broadly to a visual indication system that portrays the system state of an autonomous or non-autonomous machine. Specifically, the present description relates to a technique in which a mobile machine detects one or more objects surrounding the machine and displays visual indicators for those detected objects. While the present description is described primarily in reference to a construction machine, the description is applicable to a wide variety of agricultural machines, construction machines, mobile machinery, or heavy equipment.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of operating a visual indication system on a mobile machine, the method comprising: detecting one or more objects surrounding the mobile machine using one or more sensors of the mobile machine, wherein a direction with respect to the mobile machine is detected for each of the one or more objects; determining a current state of the mobile machine; generating an object-directed indicator for each of the one or more objects based on the current state of the mobile machine; and displaying the object-directed indicator for each of the one or more objects on the visual indication system, wherein the visual indication system at least partially surrounds the mobile machine and includes a plurality of displayable regions, wherein the object-directed indicator for a particular object of the one or more objects is displayed at a particular displayable region of the plurality of displayable regions of the visual indication system based on the direction with respect to the mobile machine of the particular object.

Example 2 is the method of example(s) 1, wherein detecting the one or more objects surrounding the mobile machine further includes: detecting a distance from the mobile machine for each of the one or more objects; and detecting the direction with respect to the mobile machine for each of the one or more objects.

Example 3 is the method of example(s) 1-2, wherein detecting the one or more objects surrounding the mobile machine further includes: detecting a position of the mobile machine in a world space; and detecting a position of each of the one or more objects in the world space based on the position of the mobile machine in the world space and the distance from the mobile machine and the direction with respect to the mobile machine of the particular object.

Example 4 is the method of example(s) 1-3, further comprising: classifying each of the one or more objects as one of a plurality of object types, wherein the plurality of object types includes a person object and a non-person object.

Example 5 is the method of example(s) 1-4, wherein the current state of the mobile machine includes one of: active job, waiting for job, or attention needed.

Example 6 is the method of example(s) 1-5, wherein the object-directed indicator for each of the one or more objects includes a safety indicator that indicates a safety level to the particular object, wherein the safety indicator is determined based on the current state of the mobile machine.

Example 7 is the method of example(s) 1-6, wherein the object-directed indicator for each of the one or more objects includes a state indicator that indicates the current state of the mobile machine to the particular object.

Example 8 is the method of example(s) 1-7, wherein the mobile machine is an autonomous vehicle.

Example 9 is the method of example(s) 1-8, wherein the one or more sensors include a LiDAR sensor.

Example 10 is a non-transitory computer-readable medium comprising instructions that, when executed by one or more processors, cause the one or more processors to perform operations comprising: detecting one or more objects surrounding a mobile machine using one or more sensors of the mobile machine, wherein a direction with respect to the mobile machine is detected for each of the one or more objects; determining a current state of the mobile machine; generating an object-directed indicator for each of the one or more objects based on the current state of the mobile machine; and displaying the object-directed indicator for each of the one or more objects on a visual indication system of the mobile machine, wherein the visual indication system at least partially surrounds the mobile machine and includes a plurality of displayable regions, wherein the object-directed indicator for a particular object of the one or more objects is displayed at a particular displayable region of the plurality of displayable regions of the visual indication system based on the direction with respect to the mobile machine of the particular object.

Example 11 is the non-transitory computer-readable medium of example(s) 10, wherein detecting the one or more objects surrounding the mobile machine further includes: detecting a distance from the mobile machine for each of the one or more objects; and detecting the direction with respect to the mobile machine for each of the one or more objects.

Example 12 is the non-transitory computer-readable medium of example(s) 10-11, wherein detecting the one or more objects surrounding the mobile machine further includes: detecting a position of the mobile machine in a world space; and detecting a position of each of the one or more objects in the world space based on the position of the mobile machine in the world space and the distance from the mobile machine and the direction with respect to the mobile machine of the particular object.

Example 13 is the non-transitory computer-readable medium of example(s) 10-12, wherein the operations further comprise: classifying each of the one or more objects as one of a plurality of object types, wherein the plurality of object types includes a person object and a non-person object.

Example 14 is the non-transitory computer-readable medium of example(s) 10-13, wherein the current state of the mobile machine includes one of: active job, waiting for job, or attention needed.

Example 15 is the non-transitory computer-readable medium of example(s) 10-14, wherein the object-directed indicator for each of the one or more objects includes a safety indicator that indicates a safety level to the particular object, wherein the safety indicator is determined based on the current state of the mobile machine.

Example 16 is the non-transitory computer-readable medium of example(s) 10-15, wherein the object-directed indicator for each of the one or more objects includes a state indicator that indicates the current state of the mobile machine to the particular object.

Example 17 is the non-transitory computer-readable medium of example(s) 10-16, wherein the mobile machine is an autonomous vehicle.

Example 18 is the non-transitory computer-readable medium of example(s) 10-17, wherein the one or more sensors include a LiDAR sensor.

Example 19 is a system comprising: one or more processors; and a computer-readable medium comprising instructions that, when executed by the one or more processors, cause the one or more processors to perform operations comprising: detecting one or more objects surrounding a mobile machine using one or more sensors of the mobile machine, wherein a direction with respect to the mobile machine is detected for each of the one or more objects; determining a current state of the mobile machine; generating an object-directed indicator for each of the one or more objects based on the current state of the mobile machine; and displaying the object-directed indicator for each of the one or more objects on a visual indication system of the mobile machine, wherein the visual indication system at least partially surrounds the mobile machine and includes a plurality of displayable regions, wherein the object-directed indicator for a particular object of the one or more objects is displayed at a particular displayable region of the plurality of displayable regions of the visual indication system based on the direction with respect to the mobile machine of the particular object.

Example 20 is the system of example(s) 19, wherein detecting the one or more objects surrounding the mobile machine further includes: detecting a distance from the mobile machine for each of the one or more objects; and detecting the direction with respect to the mobile machine for each of the one or more objects.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1A:
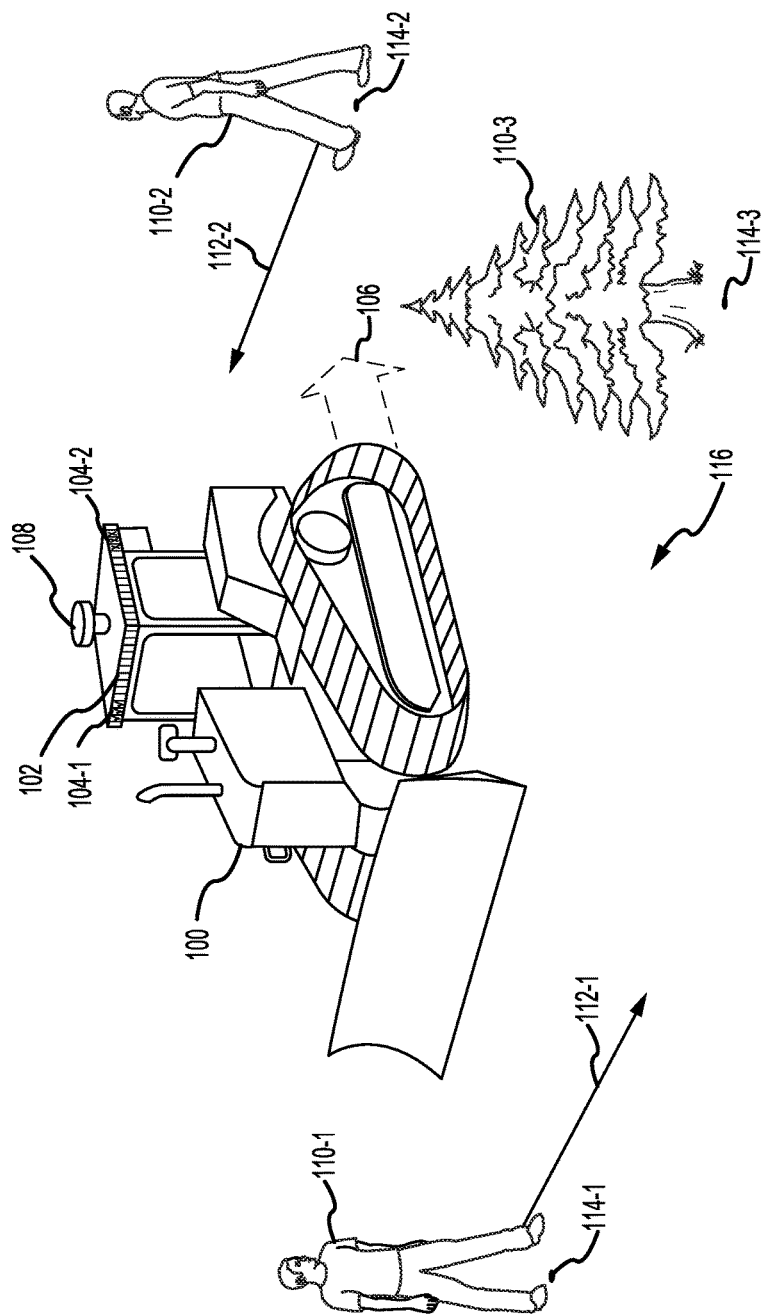
FIGS. 1A-1D illustrate examples of various embodiments of the present invention being implemented by a mobile machine within a construction environment.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Embodiments of the present invention relate to systems, methods, and other techniques for providing a visual indication system that displays object-directed indicators to objects surrounding an autonomous or non-autonomous mobile machine. The visual indication system may partially or completely surround the mobile machine and may include multiple displayable regions that may be viewed by people surrounding the mobile machine. The mobile machine may detect a person surrounding the mobile machine as well as the relative direction of the person and the distance between the person and the mobile machine. The mobile machine may then generate and display an object-directed indicator at a subset of the displayable regions based on the relative direction of the detected person such that the person can determine that a particular object-directed indicator is directed to them specifically.

The object-directed indicator can provide various information to the detected person. For example, the presence of the object-directed indicator lets the person know that they have been recognized and accounted for by the mobile machine. The object-directed indicator can further provide information regarding safety and the status or state of the mobile machine. For example, in some embodiments, the object-directed indicator can include a safety indicator that indicates a safety level to the person. The safety indicator may be encoded into the color, shape, size, pattern, or content of the object-directed indicator. For example, the safety indicator may include a set of green light emitting diodes (LEDs) that follow the person as they walked by the machine and indicate to the person that they are walking within a safety zone. As another example, the safety indicator may include a set of red LEDs that indicate to the person that they have entered a danger zone and should therefore back away from the mobile machine to a safe distance.

In some embodiments, the object-directed indicator can include a state indicator that indicates and communicates the current state of the mobile machine to the person. The state indicator may also be encoded into the color, shape, size, pattern, or content of the object-directed indicator. For example, the state indicator may include a set of solid, non-blinking LEDs that follow the person as they walked by the machine and indicate to the person that the mobile machine is currently executing an active job. As another example, the state indicator may include a set of slow blinking LEDs that indicate to the person that the mobile machine is not executing a job and is waiting to receive a job.

The functionality of the visual indication system is improved with accurate object detection sensors that are attached to and/or integrated with the mobile machine. In one example, the object detection sensor is a LiDAR sensor that is mounted to the roof of the construction machine and is oriented outward. The object detection sensor may detect the position of each object surrounding the mobile machine by detecting a distance and a direction for each object. The object detection sensor may further determine a trajectory for each detected object. The position and/or trajectory of each object may be compared to the current safety and danger zones to determine an appropriate safety indicator. For example, if the position and/or trajectory of an object intersects with the danger zone, the safety indicator may indicate to the person that they are in danger and should back away from the machine.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiments being described.

FIGS. 1A-1D illustrate examples of various embodiments of the present invention being implemented by a mobile machine 100 within a construction environment. Specifically, FIG. 1A shows mobile machine 100 being driverless and being deployed at a site 116 along with various objects 110 such as people (e.g., objects 110-1 and 110-2) and other non-person objects (e.g., object 110-3). Mobile machine 100 may have the control thereof at least partially implemented by a control unit (not shown) which may be communicatively coupled to various sensors such as an object detection sensor 108 through a wired and/or wireless connection.

While site 116 is generally described herein as corresponding to a construction site, the present disclosure is applicable to a wide variety of construction, maintenance, or agricultural projects in which heavy equipment or mobile machinery are used. Similarly, while mobile machine 100 is generally described herein as corresponding to an autonomous or driverless dozer, the various techniques described herein are applicable to a wide variety of autonomous or non-autonomous agricultural machines, construction machines, or heavy equipment such as graders, excavators, bulldozers, backhoes, pavers (e.g., concrete, asphalt, slipform, vibratory, etc.), compactors, scrapers, loaders, material handlers, combine harvesters, sprayers, and the like.

In some embodiments, mobile machine 100 may include a tractor with wheels, axles, and a gasoline-, diesel-, electric-, or steam-powered engine for providing power and traction to mobile machine 100 to drive along a desired path, often at a constant speed. Mobile machine 100 may be a tracked vehicle that incorporates a continuous track of treads or track plates that are driven by the vehicle's wheels. An operator of mobile machine 100 may provide inputs to the vehicle's control unit using various input devices such as levers, switches, buttons, pedals, steering wheels, and touch screens, which can cause various actuators to move mobile machine 100.

While deployed at site 116, mobile machine 100 may have a current vehicle state 106 from one of a finite number of possible vehicle states. Possible vehicle states include, but are not limited to: (1) executing an active job, (2) waiting to receive a job, and (3) attention needed. In some embodiments, the possible vehicle states can include greater specificity. For example, if the current vehicle state 106 is "executing an active job", a current operation of the active job may be specified, such as "moving forward", "moving in reverse", "raising/lowering implement", and the like. As another example, if the current vehicle state 106 is "attention needed", the type of attention or vehicle issue may be specified, such as "mechanical issue", "electrical issue", "system crash", and the like.

In various embodiments, mobile machine 100 may determine vehicle state 106 and may generate object-directed indicators 104 for each of objects 110 based on vehicle state 106. To accomplish this, mobile machine 100 may use object detection sensor 108 to detect objects 110 as well as their distances and directions from mobile machine 100. Mobile machine 100 may further determine positions 114 and trajectories 112 for objects 110 based on the data captured by object detection sensor 108. Mobile machine 100 may then classify objects 110-1 and 110-2 as person objects and object 110-3 as a non-person object. For each of objects 110 that were classified as person objects, mobile machine 100 may generate data for an object-directed indicator 104. Each object-directed indicator 104 may include one or both of a safety indicator or a state indicator. Both the safety indicator and the state indicator are based on vehicle state 106 and may be dynamically updated each time vehicle state 106 changes.

Figure 1B:
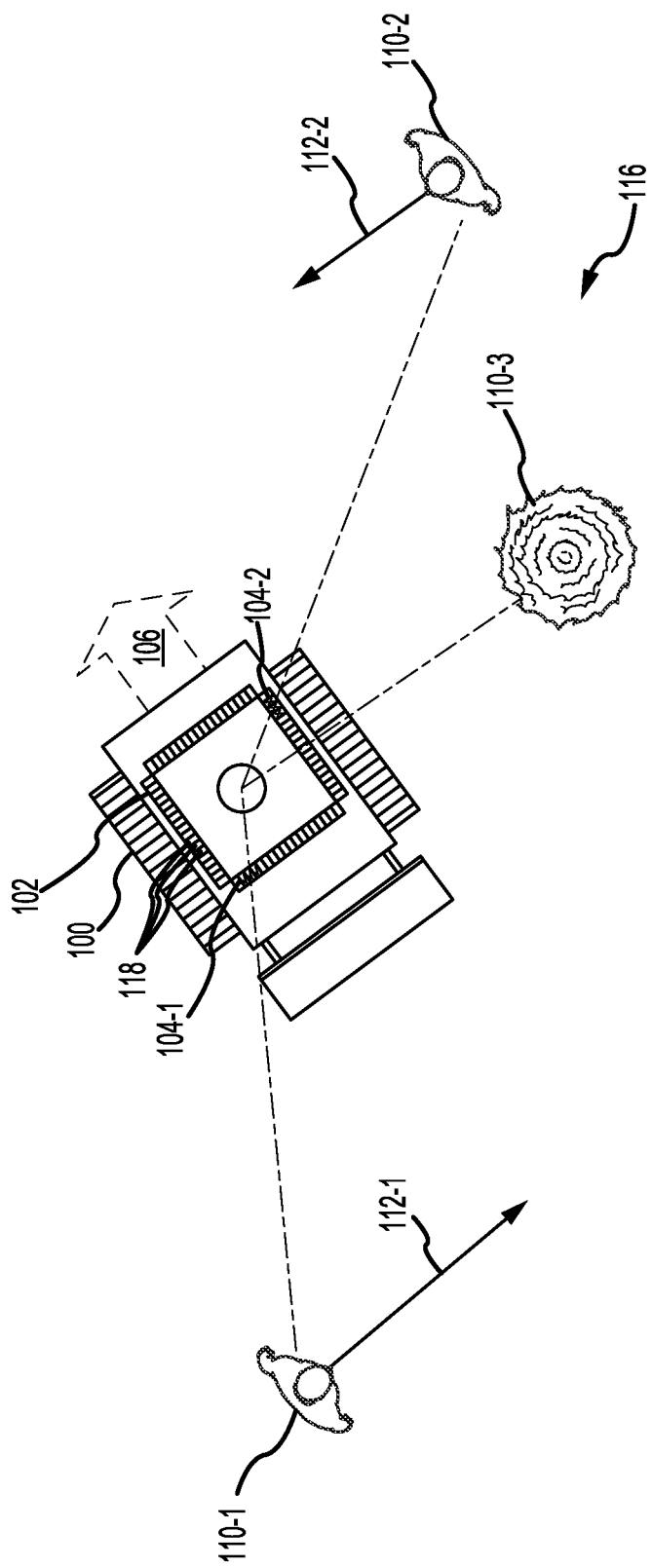

FIG. 1B illustrates an overhead view of the example depicted in FIG. 1A. In the illustrated example, mobile machine 100 detects each of objects 110, detects a current distance, direction, and trajectory 112 for each object, and classifies each object as one of two possible object types: a person object or a non-person object. Mobile machine 100 then checks current state 106 and determines that the current state is "active job—reverse", and accordingly generates object directed indicators 104 (including both safety and state indicators) based on current state 106.

For the safety indicator, mobile machine 100 creates a danger zone surrounding mobile machine 100 along its projected path (behind mobile machine 100 due to its anticipated movement in the reverse direction) and determines that trajectory 112-1 of object 110-1 will not overlap with the danger zone but that trajectory 112-2 of object 110-2 will overlap. As such, the safety indicator for object 110-1 includes a green check mark indicating a high level of safety and the safety indicator for object 110-2 includes a red X mark indicating a low level of safety. The state indicator for object 110-1 includes a solid non-blinking light and, when provided together with the corresponding safety indicator, object-directed indicator 104-1 includes a solid non-blinking green check mark. The state indicator for object 110-2 also includes a solid non-blinking light and, when provided together with the corresponding safety indicator, object-directed indicator 104-2 includes a solid non-blinking red X mark.

Visual indication system 102 includes multiple displayable regions 118 that surround mobile machine 100 such that visual indication system 102 can be viewed from multiple sides of mobile machine 100. Each of object-directed indicators 104-1 and 104-2 is displayed on one or more displayable regions of displayable regions 118 based on the direction of the corresponding object. For example, since object 110-1 has a detected direction of 260°, object-directed indicator 104-1 is displayed on the subset of displayable regions 118 that are substantially aligned with 260°. Similarly, since object 110-2 has a detected direction of 115°, object-directed indicator 104-2 is displayed on the subset of displayable regions 118 that are substantially aligned with 115°.

Figure 1C:
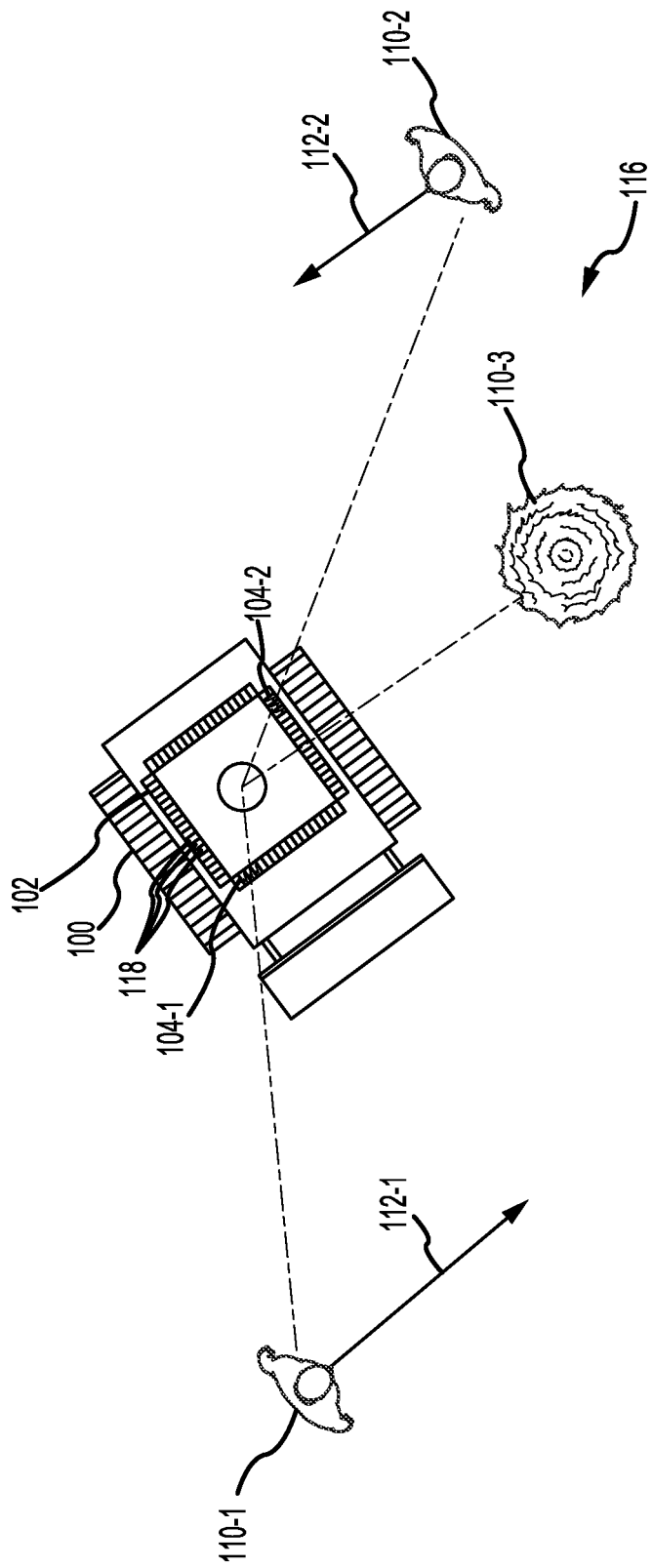

FIG. 1C illustrates an example similar to the examples depicted in FIGS. 1A and 1B but that current state 106 has changed from "active job—reverse" to "waiting for job". In the illustrated example, mobile machine 100 detects each of objects 110, detects a current distance, direction, and trajectory 112 for each object, and classifies each object as one of two possible object types: a person object or a non-person object. Mobile machine 100 then determines that current state 106 is "waiting for job", and accordingly generates object directed indicators 104 (including both safety and state indicators) based on current state 106.

For the safety indicator, mobile machine 100 creates a danger zone surrounding mobile machine 100 and determines that neither of trajectories 112 will overlap with the danger zone. As such, the safety indicators for objects 110 include a green check mark indicating a high level of safety. The state indicators for objects 110 include a slow blinking light and, when provided together with the safety indicators, object-directed indicators 104 include a slow-blinking green check mark.

Figure 1D:
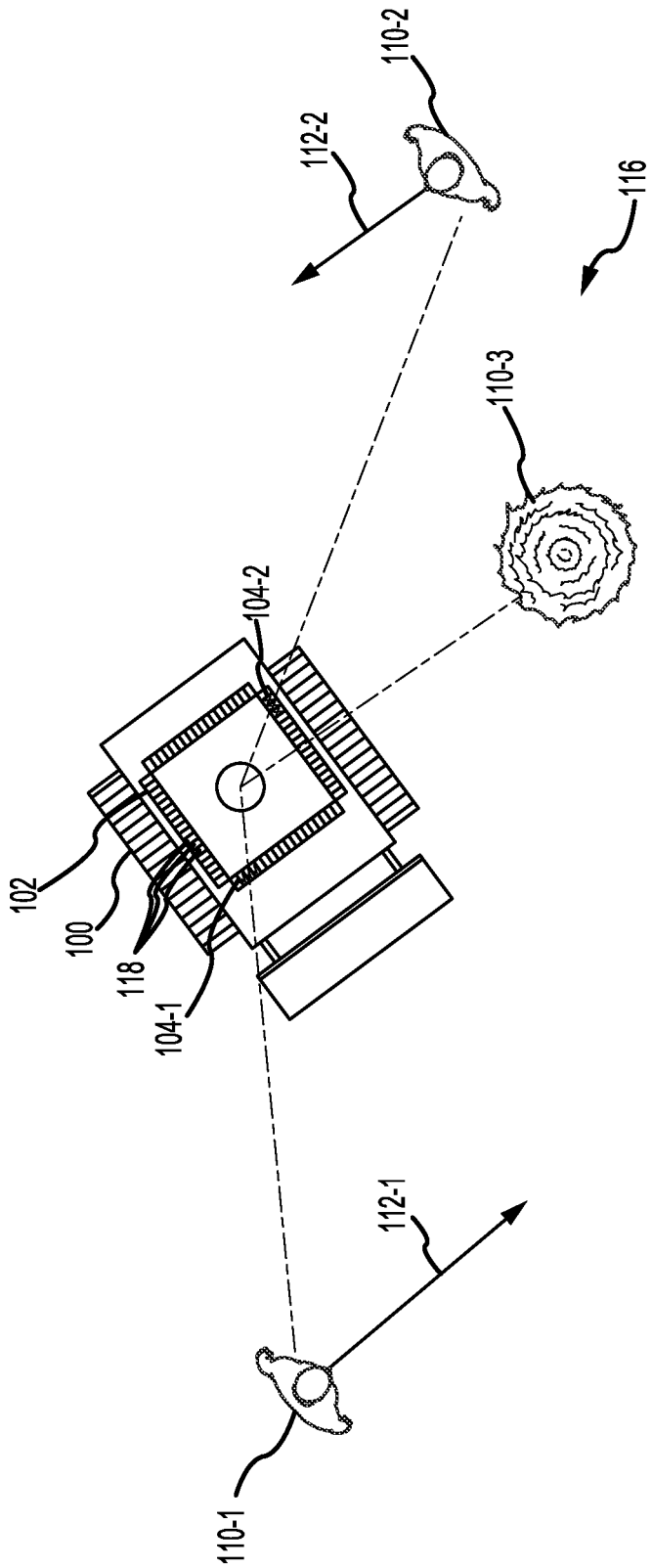

FIG. 1D illustrates an example similar to the examples depicted in FIGS. 1A-1C but that current state 106 has changed to "attention needed". In the illustrated example, mobile machine 100 detects each of objects 110, detects a current distance, direction, and trajectory 112 for each object, and classifies each object as one of three possible object types: a person non-construction worker object, a person construction worker object, or a non-person object. Mobile machine 100 then checks current state 106 and determines that the current state is "attention needed", and accordingly generates object directed indicators 104 (including both safety and state indicators) based on current state 106. In some embodiments, mobile machine 100 may utilize additional object types for construction workers when the machine state is such that certain additional information may be communicated to construction workers. In some embodiments, mobile machine 100 may utilize these additional object types irrespective of the current machine state.

For the safety indicator, mobile machine 100 creates a small danger zone surrounding mobile machine 100 (since mobile machine 100 will not be actively moving) and determines that neither of trajectories 112 will overlap with the danger zone. In the illustrated example, the safety indicator for object 110-1 includes a green check mark indicating a high level of safety and the safety indicator for object 110-2 includes a check mark also indicating a high level of safety. In the illustrated example, object-directed indicator 104-1 for object 110-1 does not include a state indicator and the state indicator for object 110-2 includes a yellow fast blinking light and, when provided together with the corresponding safety indicator, object-directed indicator 104-2 includes a yellow fast blinking check mark. In this manner, different information may be communicated to construction workers and non-construction workers.

Figure 2C:
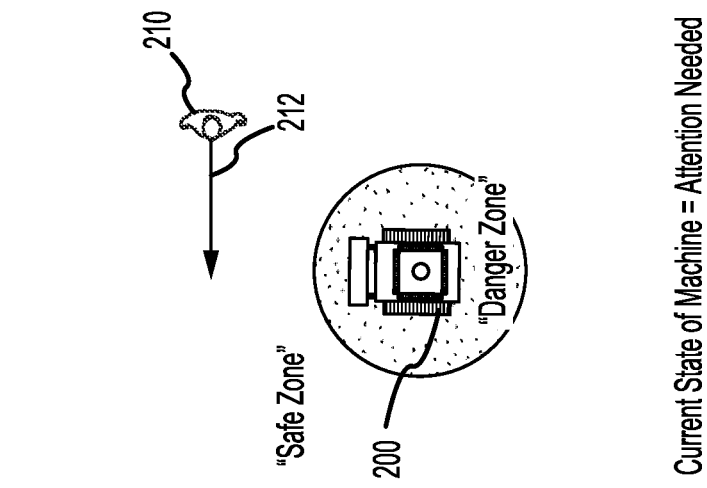
FIGS. 2A-2C illustrate examples of generating machine state-dependent safety indicators by a mobile machine.
Figure 2B:
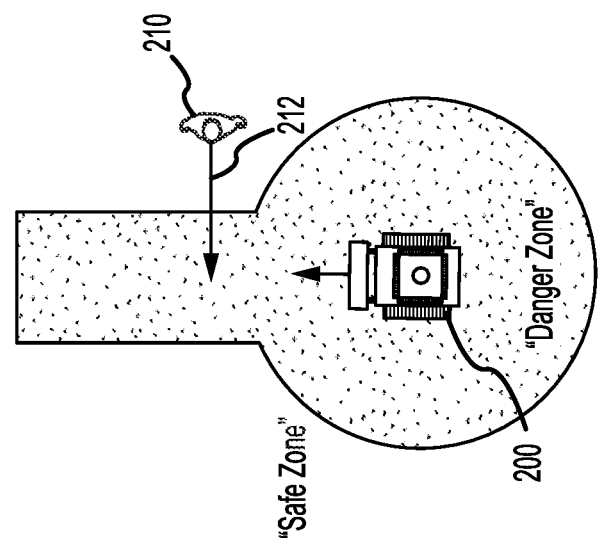
Figure 2A:
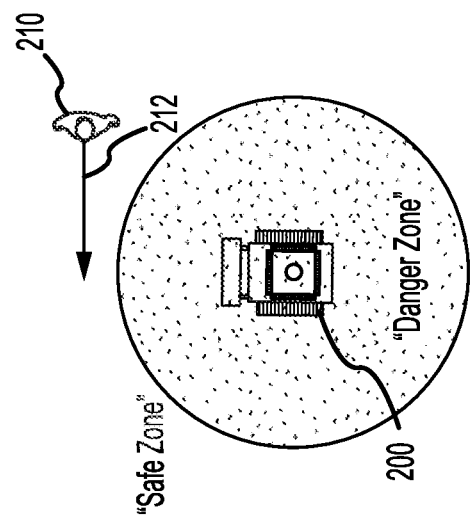

FIGS. 2A-2C illustrate examples of generating machine state-dependent safety indicators by a mobile machine 200. In FIG. 2A, mobile machine 200 may determine that its state is "waiting for job" and may according create a danger zone surrounding the current position of mobile machine 200. Mobile machine 200 may further create a safe zone for the area outside of the danger zone. In the illustrated example, mobile machine 200 detects an object 210 by detecting its current distance and direction and thereby its position with respect to mobile machine 200. Mobile machine 200 classifies object 210 as a person object and further detects a trajectory 212 for object 210. Mobile machine 200 then determines that neither the current position nor trajectory 212 of object 210 overlap with the danger zone. As such, the safety indicator for object 210 may indicate a high level of safety.

In FIG. 2B, mobile machine 200 may determine that its state is "active job—forward" and may according create a danger zone surrounding the current position of mobile machine 200 and surrounding its projected path (in front of mobile machine 200 due to its anticipated movement in the forward direction). Mobile machine 200 may further create a safe zone for the area outside of the danger zone. In the illustrated example, mobile machine 200 detects object 210 by detecting its current distance and direction and thereby its position with respect to mobile machine 200. Mobile machine 200 classifies object 210 as a person object and further detects trajectory 212 for object 210. Mobile machine 200 then determines that while the current position of object 210 does not overlap with the danger zone, trajectory 212 of object 210 does overlap with the danger zone. As such, the safety indicator for object 210 may indicate a low level of safety.

In FIG. 2C, mobile machine 200 may determine that its state is "attention needed" and may according create a small danger zone surrounding the current position of mobile machine 200. Mobile machine 200 may further create a safe zone for the area outside of the danger zone. In the illustrated example, mobile machine 200 detects object 210 by detecting its current distance and direction and thereby its position with respect to mobile machine 200. Mobile machine 200 classifies object 210 as a person object and further detects trajectory 212 for object 210. Mobile machine 200 then determines that neither the current position nor trajectory 212 of object 210 overlap with the danger zone. As such, the safety indicator for object 210 may indicate a high level of safety.

Figure 3:
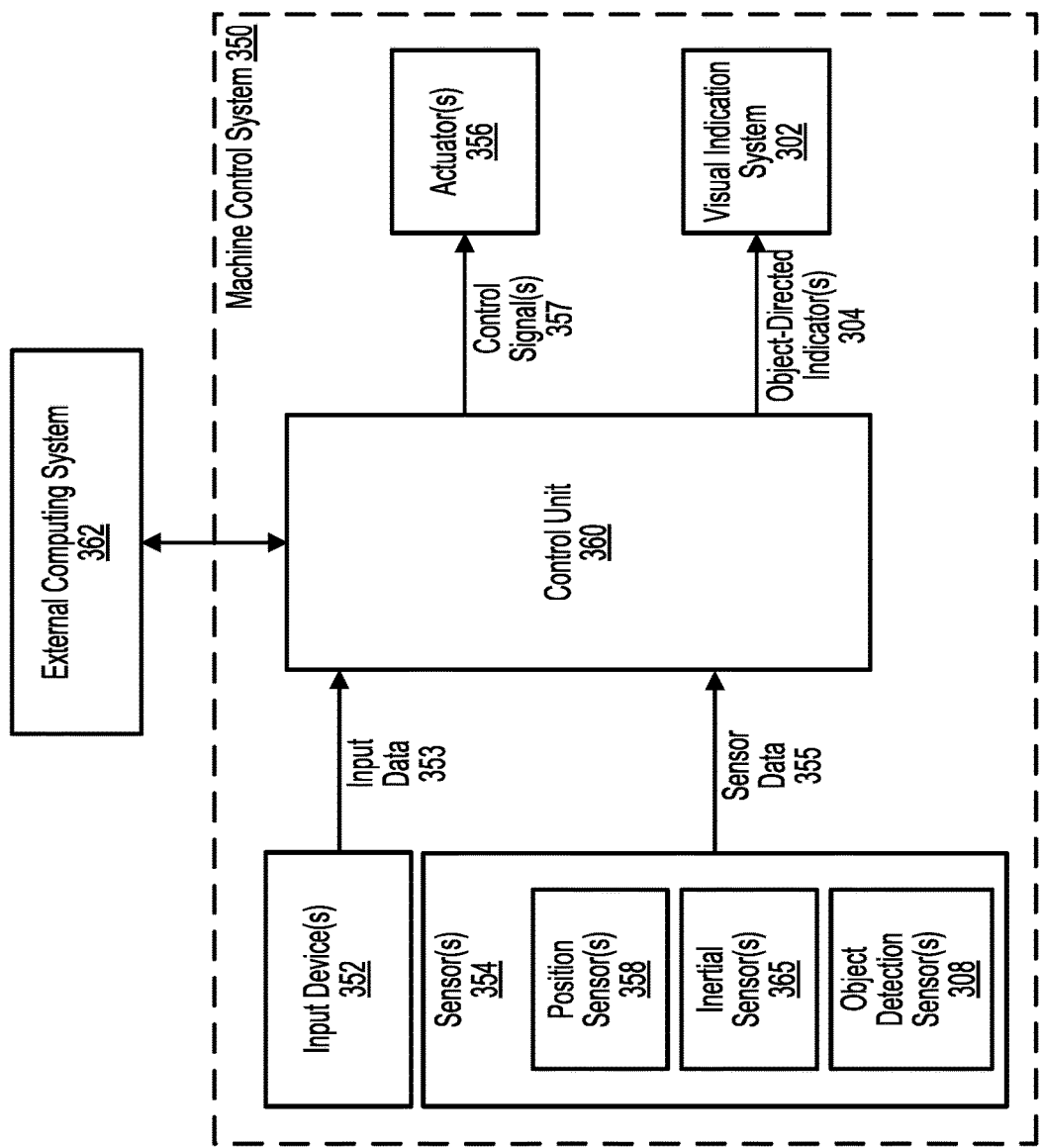
FIG. 3 illustrates an example machine control system that may be incorporated into a mobile machine.

FIG. 3 illustrates an example machine control system 300 that may be incorporated into a mobile machine, such as mobile machines 100 or 200. Machine control system 300 may include various input devices 352, sensors 354, actuators 356, and computing devices for allowing autonomous or non-autonomous completion of work-related tasks. The components of machine control system 300 may be mounted to or integrated with the components of the mobile machine such that the mobile machine may be considered to include machine control system 300. The components of machine control system 300 may be communicatively coupled to each other via one or more wired and/or wireless connections.

Machine control system 300 may include a control unit 360 that receives data from the various sensors and inputs and generates commands that are sent to the various actuators and output devices. In the illustrated example, control unit 360 receives input data 353 from input device(s) 352 and sensor data 355 from sensor(s) 354, and generates control signal(s) 357, which are sent to actuator(s) 356, and object-directed indicator(s) 304, which are sent to a visual indication system 302. Control unit 360 may include one or more processors and an associated memory. In some embodiments, control unit 360 may be communicatively coupled to an external computing system 362 located external to machine control system 300 and the mobile machine. External computing system 362 may send instructions to control unit 360 of the details of a work-related task. For example, external computing system 362 may send tasks to control unit 350 that are used to update the current state of the mobile machine. External computing system 362 may also send alerts and other general information to control unit 360, such as traffic conditions, weather conditions, the locations and status of material transfer vehicles, and the like.

In some embodiments, input device(s) 352 may receive input data 353 that indicates a desired movement of the machine, a desired movement of the machine's implement, a desired height of the implement, an activation of one or more mechanisms on the implement (e.g., sprayers, cutters, etc.), and the like. Input device(s) 352 may include a keyboard, a touchscreen, a touchpad, a switch, a lever, a button, a steering wheel, an acceleration pedal, a brake pedal, and the like. In some embodiments, input device(s) 352 may be mounted to any physical part of the mobile machine, such as within the cab of the vehicle.

In some embodiments, sensor(s) 354 may include one or more position sensor(s) 358, inertial sensor(s) 365, and/or object detection sensor(s) 308. Position sensor(s) 358 may be a combination of GNSS receivers, which determine position using wireless signals received from satellites, and total stations, which determine position by combining distance, vertical angle, and horizontal angle measurements. Inertial sensor(s) 365 may include one or more sensors that detect movement of the components of the vehicle to which they are rigidly attached. For example, inertial sensor(s) 365 may include one or more gyroscopes for detecting angular acceleration, angular rate and/or angular position, one or more accelerometers for detecting linear acceleration, linear velocity, and/or linear position, one or more inertial measurement units (IMUs) which may each include one or more accelerometers, one or more gyroscopes, and/or one or more magnetometers for detecting the above-listed types of data, among other possibilities. In some instances, sensor data 355 includes accelerometer data, which is data captured by an accelerometer of inertial sensor(s) 365, and/or gyro data, which is data captured by a gyroscope of inertial sensor(s) 365.

In some embodiments, inertial sensor(s) 365 may directly detect angular rate and may integrate to obtain angular position, or alternatively an inertial sensor may directly measure angular position and may determine a change in angular position (e.g., compute the derivative) to obtain angular rate. In many instances, inertial sensor(s) 365 can be used to determine the yaw angle (rotation angle with respect to a vertical axis), the pitch angle (rotation angle with respect to a transverse axis), and/or the roll angle (rotation angle with respect to a longitudinal axis) of the vehicle.

Object detection sensor(s) 308 may include any suitable sensor for detecting a distance, a direction, and/or a position of an object near the machine. Such sensors may employ a number of technologies such as LiDAR, radar, ultrasonic, and various image capture technologies (e.g., cameras). For example, object detection sensor(s) 308 may include a LiDAR sensor mounted to the roof of the mobile machine that detects a distance and direction to each object surrounding the mobile machine. In another example, object detection sensor(s) 308 may include multiple acoustic sensors (e.g., ultrasonic distance sensors) that are mounted around the sides of the mobile machine so as to detect objects at shorter distances along all sides of the mobile machine.

Control unit 360 may include various controllers and modules to assist in the generation of control signal(s) 357 and object-directed indicator(s) 304. Each of the controllers and modules may include dedicated hardware and/or may be performed using the main processor and/or memory of control unit 360. For example, control unit 360 may include various self-driving or autonomous modules that may receive a task from external computing system 362, process input data 353 and sensor data 355 in accordance with the task, and generate control signal(s) 357 and object-directed indicator(s) 304 based on the task, all without human intervention.

Control signal(s) 357 may include direct current (DC) or alternating current (AC) voltage signals, DC or AC current signals, and/or information-containing signals. In some instances, control signal(s) 357 include a pneumatic or hydraulic pressure. Upon receiving control signal(s) 357, actuator(s) 356 may be caused to move in a specified manner, such as by extending, retracting, rotating, lifting, or lowering by a specified amount. Actuator(s) 356 may use various forms of power to provide movement to the components of the vehicle. For example, actuator(s) 356 may be electric, hydraulic, pneumatic, mechanical, or thermal, among other possibilities.

Figure 4:
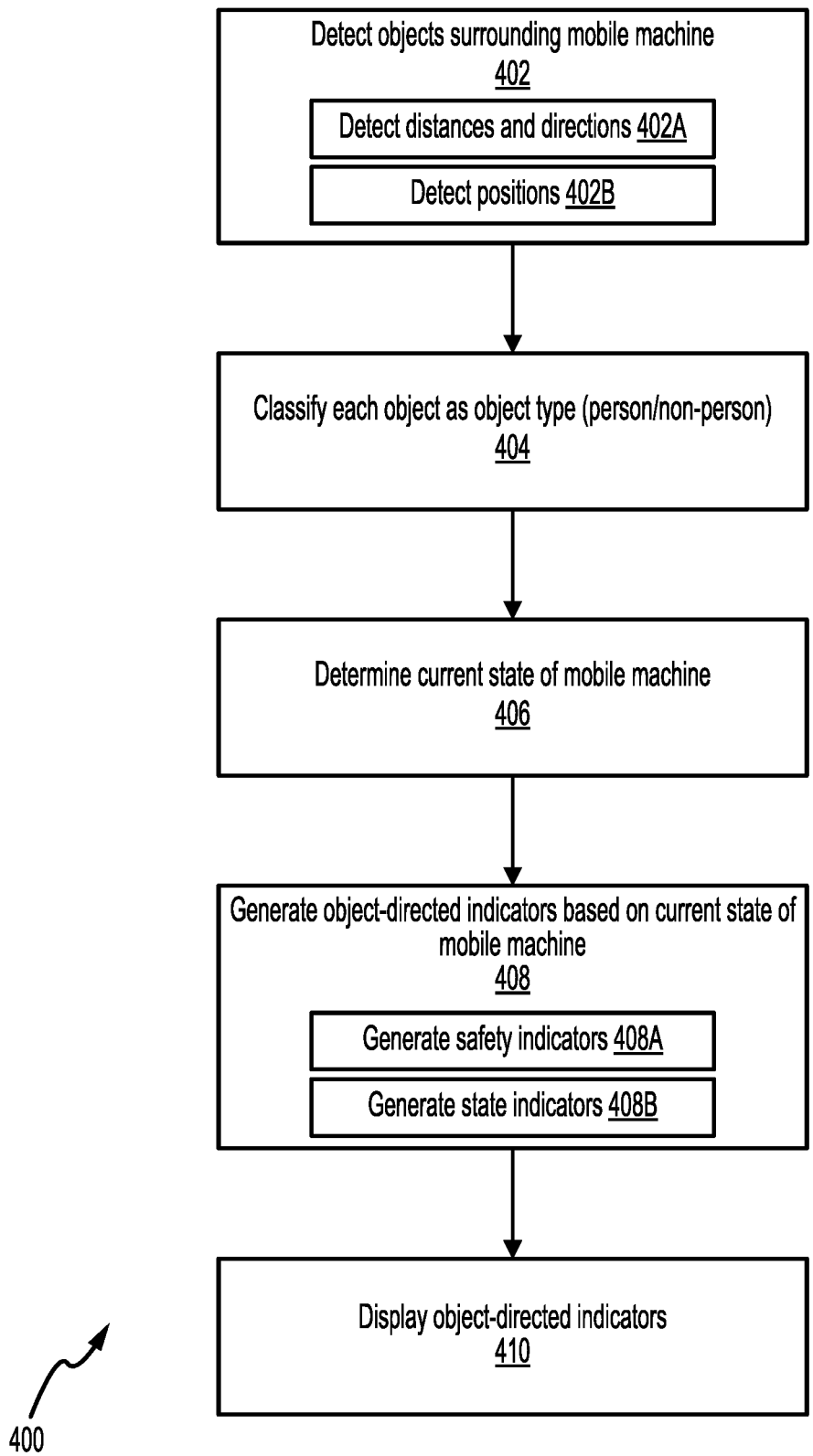
FIG. 4 illustrates a method of operating a visual indication system on a mobile machine.

FIG. 4 illustrates a method 400 of operating a visual indication system on a mobile machine, in accordance with various embodiments of the present disclosure. One or more steps of method 400 may be omitted during performance of method 400, and steps of method 400 need not be performed in the order shown. One or more steps of method 400 may be performed by one or more processors, such as those included in a control unit (e.g., control unit 360) of a machine control system (e.g., machine control system 350). Method 400 may be implemented as a computer-readable medium or computer program product comprising instructions which, when the program is executed by one or more computers, cause the one or more computers to carry out the steps of method 400.

At step 402, objects (e.g., objects 110, 210) surrounding a mobile machine (e.g., mobile machines 100, 200) are detected. The objects may be detected using one or more sensors (e.g., object detection sensors 108, 308) of the mobile machine. The one or more sensors may be attached to and/or integrated with the mobile machine. The one or more sensors may include a LiDAR sensor, an ultrasonic sensor, a radar sensor, a camera, among other possibilities. The one or more objects may include people, animals, trees, buildings, structures, among other possibilities.

Optionally, step 402 may include one or both of steps 402A and 402B. At step 402A, distances and directions with respect to the mobile machine are detected for the one or more objects. For example, a distance with respect to the mobile machine (the distance separating the object and mobile machine) may be detected for each of the one or more objects, and/or a direction with respect to the mobile machine may be detected for each of the one or more objects. At step 402B, positions (e.g., positions 114) with respect to the mobile machine are detected for the one or more objects. For example, a position of each of the one or more objects in a machine space may be detected based on each object's corresponding distance and direction. Optionally, the mobile machine may detect its own position in a world space (e.g., using a position sensor such as a GNSS receiver) and may convert the positions of the one or more objects from the machine space to the world space. The positions of objects can then be communicated between different mobile machines at the project site.

Optionally, a trajectory (e.g., trajectories 112, 212) for each of the one or more objects may be detected by the mobile machine. In some embodiments, the trajectory of an object is detected by detecting the position of the object at multiple instants in time. The mobile machine can analyze the multiple positions to determine a velocity and a movement direction of the object, which can be used for the detected trajectory.

At step 404, each of the one or more objects is classified as one of a plurality of object types. The plurality of object types may include a person object and a non-person object. In some embodiments, the plurality of object types may include a person construction worker object, a person non-construction worker object, and a non-person object. Further examples of object types may include other mobile machines, vehicles, high hazard objects (cliffs, water, etc.), low hazard objects (trees, rocks, etc.), among other possibilities. In some embodiments, the one or more objects are classified using an image classifier, such as a trained neural network image classifier. In some embodiments, the one or more objects are classified based on the trajectory of the object (e.g., objects with no trajectories may be non-person objects), the size or shape of the object, the position of the object with respect to other objects (e.g., the object is on the sidewalk), among other possibilities. In some embodiments, step 404 is omitted from method 400.

At step 406, a current state (e.g., vehicle state 106) of the mobile machine is determined. The current state of the mobile machine may be received from an external computing system (e.g., external computing system 362) and/or may be determined based on a task received from the external computing system. Optionally, the current state of the mobile machine may be determined by the control unit of the machine control system by accessing a memory location that stores the current state of the mobile machine. The current vehicle of the mobile machine may be one of a finite number of possible vehicle states, which may include, but are not limited to: (1) executing an active job, (2) waiting to receive a job, and (3) attention needed.

At step 408, an object-directed indicator (e.g., object-directed indicators 104, 304) is generated for each of the one or more objects based on the current state of the mobile machine. In some embodiments, the object-directed indicator is generated for each of the one or more objects that was classified as a person object (including a person construction worker object or a person non-construction worker object) and not for any of the one or more objects that was classified as a non-person object. The object-directed indicator may communicate to the one or more objects that they are accounted for by the mobile machine and further can provide some indication regarding the current state of the mobile machine.

Optionally, step 408 may include one or both of steps 408A and 408B. At step 408A, a safety indicator is generated for each of the one or more objects based on the current state of the mobile machine. The safety indicator generated for a particular object is included in the object-directed indicator for that object. The safety indicator indicates a safety level to the particular object. In various embodiments, the safety indicator may be encoded into the color, shape, size, pattern, or content of the object-directed indicator and may take on a wide range of possible colors, shapes, sizes, patterns, etc., and should therefore not be understood to be limited to the specific examples provided herein (e.g., green check mark, red X mark, etc.).

At step 408B, a state indicator is generated for each of the one or more objects based on the current state of the mobile machine. The state indicator generated for a particular object is included in the object-directed indicator for that object. The state indicator directly indicates the current state of the mobile machine to the particular object. In various embodiments, the state indicator may be encoded into the color, shape, size, pattern, or content of the object-directed indicator and may take on a wide range of possible colors, shapes, sizes, patterns, etc., and should therefore not be understood to be limited to the specific examples provided herein (e.g., solid non-blinking, slow blinking, fast blinking, etc.).

At step 410, the object-directed indicator for each of the one or more objects is displayed on a visual indication system (e.g., visual indication systems 102, 302) of the mobile machine. The visual indication system may be attached to and/or integrated with the mobile machine. The visual indication system may at least partially surround (e.g., partially surround or completely surround) the mobile machine such that a plurality of displayable regions (e.g., displayable regions 118) of the visual indication system may be viewed from multiple sides of the mobile machine.

The object-directed indicator for a particular object of the one or more objects may be displayed at a particular displayable region of the plurality of displayable regions based on the detected direction of the object. For example, the object-directed indicator for an object that was detected to be directly East of the mobile machine may be displayed at a displayable region that faces East, and similarly the object-directed indicator for an object that was detected to be directly North of the mobile machine may be displayed at a displayable region that faces North. In some embodiments, each of the object-directed indicators may be displayed concurrently and/or simultaneously. In some embodiments, the plurality of displayable regions may correspond to different pixels of a digital display.

Optionally, method 400 may include additional steps not shown in FIG. 4 in which the mobile machine performs various follow-up actions based on the detected objects and/or their classifications. In some instances, the mobile machine may communicate the positions and trajectories of each of the one or more objects to other nearby mobile machines and/or to the external computing system. The nearby mobile machines may, for example, use this information to perform one or more of the steps of method 400 and generate and display their own object-directed indicators. In some instances, the mobile machine can modify its behavior based on the detected objects and/or their classifications. For example, the mobile machine may modify its current state and/or modify its movement if any safety indicator indicates a low level of safety. For example, the mobile machine may perform obstacle avoidance maneuvers to avoid people or stationary objects while completing an active job. The mobile machine may further determine that while an object will pass through the danger zone, the object may be moving so quickly that the mobile machine does not need to perform any obstacle avoidance maneuvers. Other possibilities are contemplated.

Figure 5:
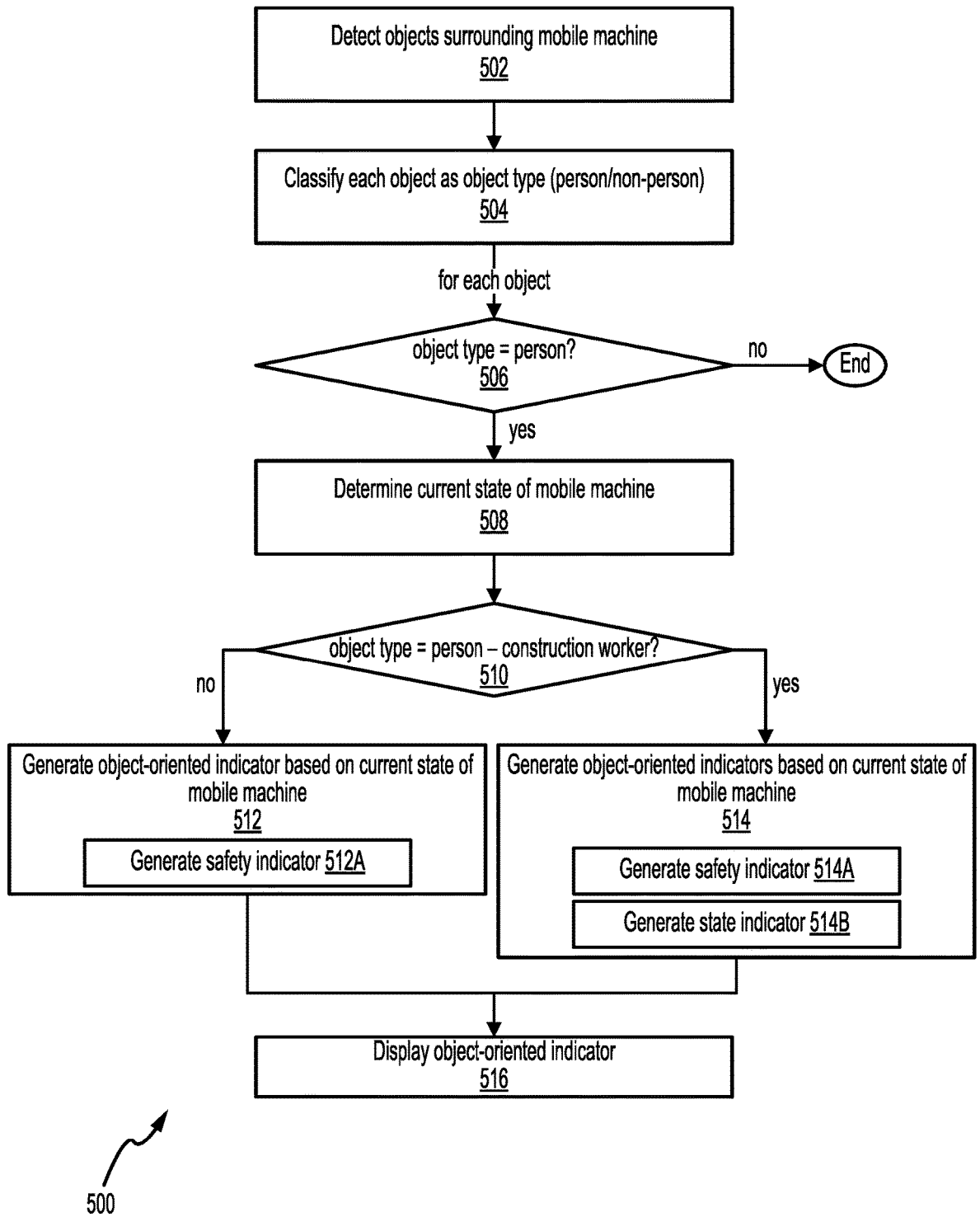
FIG. 5 illustrates a method of operating a visual indication system on a mobile machine.

FIG. 5 illustrates a method 500 of operating a visual indication system on a mobile machine, in accordance with various embodiments of the present disclosure. One or more steps of method 500 may be omitted during performance of method 500, and steps of method 500 need not be performed in the order shown. One or more steps of method 500 may be performed by one or more processors, such as those included in a control unit of a machine control system. One or more steps of method 500 may correspond to one or more steps of method 400.

At step 502, which may be similar to step 402, objects surrounding a mobile machine are detected. At step 504, which may be similar to step 404, each of the one or more objects is classified as one of a plurality of object types. In various embodiments, each of steps 506 to 516 may be performed for each object of the detected objects.

At step 506, it is determined whether the object was classified as a person object. If the object was not classified as a person object, then method 500 moves on to the next object or ends. If the object was classified as a person object, then method 500 proceeds to step 508. At step 508, which may be similar to step 406, a current state of the mobile machine is determined.

At step 510, it is determined whether the object was classified as a person construction worker object. If the object was not classified as a person construction worker object, then method 500 proceeds to step 512. If the object was classified as a person construction worker object, then method 500 proceeds to step 514.

At step 512, which may be similar to step 408, an object-directed indicator is generated for the object. At step 512A, which may be similar to step 408A, a safety indicator is generated for the object. In some embodiments, step 512 may include generating the safety indicator but not generating a state indicator for the object.

At step 514, which may be similar to step 408, an object-directed indicator is generated for the object. At step 514A, which may be similar to step 408A, a safety indicator is generated for the object. At step 514B, which may be similar to step 408B, a state indicator is generated for the object. In some embodiments, step 514 may include generating both the safety indicator and the state indicator for the object.

At step 516, which may be similar to step 410, the object-directed indicator for the object is displayed on a visual indication system.

Figure 6:
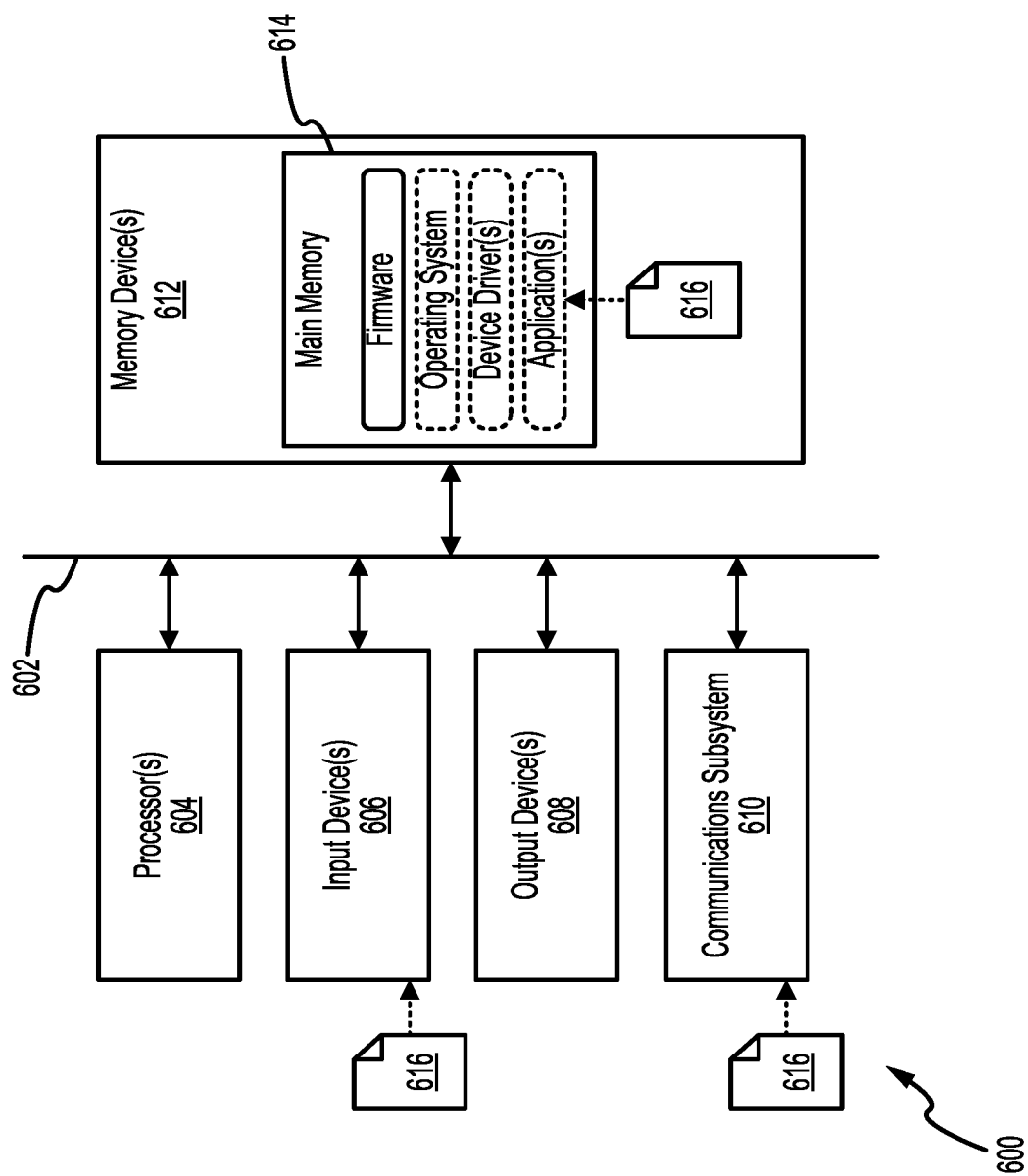
FIG. 6 illustrates an example computer system comprising various hardware elements.

FIG. 6 illustrates an example computer system 600 comprising various hardware elements, according to some embodiments of the present disclosure. Computer system 600 may be incorporated into or integrated with devices described herein and/or may be configured to perform some or all of the steps of the methods provided by various embodiments. For example, in various embodiments, computer system 600 may be incorporated into a control unit (e.g., control unit 360) and/or may be configured to perform a method of operating a visual indication system (e.g., methods 400, 500). It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

In the illustrated example, computer system 600 includes a communication medium 602, one or more processor(s) 604, one or more input device(s) 606, one or more output device(s) 608, a communications subsystem 610, and one or more memory device(s) 612. Computer system 600 may be implemented using various hardware implementations and embedded system technologies. For example, one or more elements of computer system 600 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 600 may be coupled via communication medium 602. While communication medium 602 is illustrated as a single connection for purposes of clarity, it should be understood that communication medium 602 may include various numbers and types of communication media for transferring data between hardware elements. For example, communication medium 602 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 602 may include one or more buses connecting pins of the hardware elements of computer system 600. For example, communication medium 602 may include a bus connecting processor(s) 604 with main memory 614, referred to as a system bus, and a bus connecting main memory 614 with input device(s) 606 or output device(s) 608, referred to as an expansion bus. The system bus may consist of several elements, including an address bus, a data bus, and a control bus. The address bus may carry a memory address from processor(s) 604 to the address bus circuitry associated with main memory 614 in order for the data bus to access and carry the data contained at the memory address back to processor(s) 604. The control bus may carry commands from processor(s) 604 and return status signals from main memory 614. Each bus may include multiple wires for carrying multiple bits of information and each bus may support serial or parallel transmission of data.

Processor(s) 604 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 604 may include one or more multi-core processors, in which each core may read and execute program instructions simultaneously with the other cores.

Input device(s) 606 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 606 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 608 may include one or more of various devices that convert information into human-readable form, such as without limitation a display device, a speaker, a printer, and/or the like. Output device(s) 608 may also include devices for writing to removable storage devices or other removable media, such as those described in reference to input device(s) 606. Output device(s) 608 may also include various actuators for causing physical movement of one or more components. Such actuators may be hydraulic, pneumatic, electric, and may be provided with control signals by computer system 600.

Communications subsystem 610 may include hardware components for connecting computer system 600 to systems or devices that are located external computer system 600, such as over a computer network. In various embodiments, communications subsystem 610 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 612 may include the various data storage devices of computer system 600. For example, memory device(s) 612 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 604 and memory device(s) 612 are illustrated as being separate elements, it should be understood that processor(s) 604 may include varying levels of on-processor memory, such as processor registers and caches that may be utilized by a single processor or shared between multiple processors.

Memory device(s) 612 may include main memory 614, which may be directly accessible by processor(s) 604 via the memory bus of communication medium 602. For example, processor(s) 604 may continuously read and execute instructions stored in main memory 614. As such, various software elements may be loaded into main memory 614 to be read and executed by processor(s) 604 as illustrated in FIG. 6. Typically, main memory 614 is volatile memory, which loses all data when power is turned off and accordingly needs power to preserve stored data. Main memory 614 may further include a small portion of non-volatile memory containing software (e.g., firmware, such as BIOS) that is used for reading other software stored in memory device(s) 612 into main memory 614. In some embodiments, the volatile memory of main memory 614 is implemented as random-access memory (RAM), such as dynamic RAM (DRAM), and the non-volatile memory of main memory 614 is implemented as read-only memory (ROM), such as flash memory, erasable programmable read-only memory (EPROM), or electrically erasable programmable read-only memory (EEPROM).

Computer system 600 may include software elements, shown as being currently located within main memory 614, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 616, executable by computer system 600. In one example, such instructions 616 may be received by computer system 600 using communications subsystem 610 (e.g., via a wireless or wired signal carrying instructions 616), carried by communication medium 602 to memory device(s) 612, stored within memory device(s) 612, read into main memory 614, and executed by processor(s) 604 to perform one or more steps of the described methods. In another example, instructions 616 may be received by computer system 600 using input device(s) 606 (e.g., via a reader for removable media), carried by communication medium 602 to memory device(s) 612, stored within memory device(s) 612, read into main memory 614, and executed by processor(s) 604 to perform one or more steps of the described methods.

In some embodiments of the present disclosure, instructions 616 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 600. For example, the non-transitory computer-readable medium may be one of memory device(s) 612, as shown in FIG. 6, with instructions 616 being stored within memory device(s) 612. In some cases, the non-transitory computer-readable medium may be separate from computer system 600. In one example, the non-transitory computer-readable medium may be a removable media provided to input device(s) 606, such as those described in reference to input device(s) 606, as shown in FIG. 6, with instructions 616 being provided to input device(s) 606. In another example, the non-transitory computer-readable medium may be a component of a remote electronic device, such as a mobile phone, that may wirelessly transmit a data signal carrying instructions 616 to computer system 600 using communications subsystem 616, as shown in FIG. 6, with instructions 616 being provided to communications subsystem 610.

Instructions 616 may take any suitable form to be read and/or executed by computer system 600. For example, instructions 616 may be source code (written in a human-readable programming language such as Java, C, C++, C#, Python), object code, assembly language, machine code, microcode, executable code, and/or the like. In one example, instructions 616 are provided to computer system 600 in the form of source code, and a compiler is used to translate instructions 616 from source code to machine code, which may then be read into main memory 614 for execution by processor(s) 604. As another example, instructions 616 are provided to computer system 600 in the form of an executable file with machine code that may immediately be read into main memory 614 for execution by processor(s) 604. In various examples, instructions 616 may be provided to computer system 600 in encrypted or unencrypted form, compressed or uncompressed form, as an installation package or an initialization for a broader software deployment, among other possibilities.

In one aspect of the present disclosure, a system (e.g., computer system 600) is provided to perform methods in accordance with various embodiments of the present disclosure. For example, some embodiments may include a system comprising one or more processors (e.g., processor(s) 604) that are communicatively coupled to a non-transitory computer-readable medium (e.g., memory device(s) 612 or main memory 614). The non-transitory computer-readable medium may have instructions (e.g., instructions 616) stored therein that, when executed by the one or more processors, cause the one or more processors to perform the methods described in the various embodiments.

In another aspect of the present disclosure, a computer-program product that includes instructions (e.g., instructions 616) is provided to perform methods in accordance with various embodiments of the present disclosure. The computer-program product may be tangibly embodied in a non-transitory computer-readable medium (e.g., memory device(s) 612 or main memory 614). The instructions may be configured to cause one or more processors (e.g., processor(s) 604) to perform the methods described in the various embodiments.

In another aspect of the present disclosure, a non-transitory computer-readable medium (e.g., memory device(s) 612 or main memory 614) is provided. The non-transitory computer-readable medium may have instructions (e.g., instructions 616) stored therein that, when executed by one or more processors (e.g., processor(s) 604), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of operating a visual indication system on a mobile machine, the method comprising:
    detecting a plurality of objects surrounding the mobile machine using one or more sensors of the mobile machine, the plurality of objects including a first object and a second object, wherein a direction with respect to the mobile machine is detected for each of the plurality of objects;
    determining a current state of the mobile machine;
    generating an object-directed indicator for each of the plurality of objects based on the current state of the mobile machine including a first object-directed indicator for the first object and a second object-directed indicator for the second object;
    displaying the object-directed indicator for each of the plurality of objects on the visual indication system, wherein the visual indication system at least partially surrounds the mobile machine and includes a plurality of displayable regions, wherein the object-directed indicator for a particular object of the plurality of objects is displayed at a particular displayable region of the plurality of displayable regions of the visual indication system based on the direction with respect to the mobile machine of the particular object, wherein the first object-directed indicator is displayed at a first displayable region concurrently with displaying the second object-directed indicator at a second displayable region different than the first displayable region, and wherein the first object-directed indicator is different than the second object-directed indicator; and
    causing the first object-directed indicator and the second object-directed indicator to follow the first object and the second object as the first object and the second object move relative to the mobile machine by displaying the first object-directed indicator and the second object-directed indicator at displayable regions that are adjacent to the first displayable region and the second displayable region.

2. The method of claim 1, wherein detecting the plurality of objects surrounding the mobile machine further includes:
    detecting a distance from the mobile machine for each of the plurality of objects; and
    detecting the direction with respect to the mobile machine for each of the plurality of objects.

3. The method of claim 1, wherein detecting the plurality of objects surrounding the mobile machine further includes:
    detecting a position of the mobile machine in a world space; and
    detecting a position of each of the plurality of objects in the world space based on the position of the mobile machine in the world space and the distance from the mobile machine and the direction with respect to the mobile machine of the particular object.

4. The method of claim 1, further comprising:
    classifying each of the plurality of objects as one of a plurality of object types, wherein the plurality of object types includes a person object and a non-person object.

5. The method of claim 1, wherein the current state of the mobile machine includes one of: active job, waiting for job, or attention needed.

6. The method of claim 1, wherein the object-directed indicator for each of the plurality of objects includes a safety indicator that indicates a safety level to the particular object, wherein the safety indicator is determined based on the current state of the mobile machine.

7. The method of claim 1, wherein the object-directed indicator for each of the plurality of objects includes a state indicator that indicates the current state of the mobile machine to the particular object.

8. The method of claim 1, wherein the mobile machine is an autonomous vehicle.

9. The method of claim 1, wherein the one or more sensors include a LiDAR sensor.

10. A non-transitory computer-readable medium comprising instructions that, when executed by one or more processors, cause the one or more processors to perform operations comprising:
   detecting a plurality of objects surrounding a mobile machine using one or more sensors of the mobile machine, the plurality of objects including a first object and a second object, wherein a direction with respect to the mobile machine is detected for each of the plurality of objects;
   determining a current state of the mobile machine;
   generating an object-directed indicator for each of the plurality of objects based on the current state of the mobile machine including a first object-directed indicator for the first object and a second object-directed indicator for the second object;
   displaying the object-directed indicator for each of the plurality of objects on a visual indication system of the mobile machine, wherein the visual indication system at least partially surrounds the mobile machine and includes a plurality of displayable regions, wherein the object-directed indicator for a particular object of the plurality of objects is displayed at a particular displayable region of the plurality of displayable regions of the visual indication system based on the direction with respect to the mobile machine of the particular object, wherein the first object-directed indicator is displayed at a first displayable region concurrently with displaying the second object-directed indicator at a second displayable region different than the first displayable region, and wherein the first object-directed indicator is different than the second object-directed indicator; and
   causing the first object-directed indicator and the second object-directed indicator to follow the first object and the second object as the first object and the second object move relative to the mobile machine by displaying the first object-directed indicator and the second object-directed indicator at displayable regions that are adjacent to the first displayable region and the second displayable region.

11. The non-transitory computer-readable medium of claim 10, wherein detecting the plurality of objects surrounding the mobile machine further includes:
   detecting a distance from the mobile machine for each of the plurality of objects; and
   detecting the direction with respect to the mobile machine for each of the plurality of objects.

12. The non-transitory computer-readable medium of claim 10, wherein detecting the plurality of objects surrounding the mobile machine further includes:
   detecting a position of the mobile machine in a world space; and
   detecting a position of each of the plurality of objects in the world space based on the position of the mobile machine in the world space and the distance from the mobile machine and the direction with respect to the mobile machine of the particular object.

13. The non-transitory computer-readable medium of claim 10, wherein the operations further comprise:
   classifying each of the plurality of objects as one of a plurality of object types, wherein the plurality of object types includes a person object and a non-person object.

14. The non-transitory computer-readable medium of claim 10, wherein the current state of the mobile machine includes one of: active job, waiting for job, or attention needed.

15. The non-transitory computer-readable medium of claim 10, wherein the object-directed indicator for each of the plurality of objects includes a safety indicator that indicates a safety level to the particular object, wherein the safety indicator is determined based on the current state of the mobile machine.

16. The non-transitory computer-readable medium of claim 10, wherein the object-directed indicator for each of the plurality of objects includes a state indicator that indicates the current state of the mobile machine to the particular object.

17. The non-transitory computer-readable medium of claim 10, wherein the mobile machine is an autonomous vehicle.

18. The non-transitory computer-readable medium of claim 10, wherein the one or more sensors include a LiDAR sensor.

19. A system comprising:
   one or more processors; and
   a computer-readable medium comprising instructions that, when executed by the one or more processors, cause the one or more processors to perform operations comprising:
      detecting a plurality of objects surrounding a mobile machine using one or more sensors of the mobile machine, the plurality of objects including a first object and a second object, wherein a direction with respect to the mobile machine is detected for each of the plurality of objects;
      determining a current state of the mobile machine;
      generating an object-directed indicator for each of the plurality of objects based on the current state of the mobile machine including a first object-directed indicator for the first object and a second object-directed indicator for the second object;
      displaying the object-directed indicator for each of the plurality of objects on a visual indication system of the mobile machine, wherein the visual indication system at least partially surrounds the mobile machine and includes a plurality of displayable regions, wherein the object-directed indicator for a particular object of the plurality of objects is displayed at a particular displayable region of the plurality of displayable regions of the visual indication system based on the direction with respect to the mobile machine of the particular object, wherein the first object-directed indicator is displayed at a first displayable region concurrently with displaying the second object-directed indicator at a second displayable region different than the first displayable region, and wherein the first object-directed indicator is different than the second object-directed indicator; and causing the first object-directed indicator and the second object-directed indicator to follow the first object and the second object as the first object and the second object move relative to the mobile machine by displaying the first object-directed indicator and the second object-directed indicator at displayable regions that are adjacent to the first displayable region and the second displayable region.

20. The system of claim 19, wherein detecting the plurality of objects surrounding the mobile machine further includes:

detecting a distance from the mobile machine for each of the plurality of objects; and detecting the direction with respect to the mobile machine for each of the plurality of objects.

\* \* \* \* \*